United States Patent Office 3,392,134
Patented July 9, 1968

3,392,134
PROCESS FOR PREPARING PREVULCANIZED
CHLOROPRENE POLYMER LATICES
David Apotheker, Wilmington, Del., assignor to E. I. du
Pont de Nemours and Company, Wilmington, Del., a
corporation of Delaware
No Drawing. Filed Feb. 20, 1964, Ser. No. 346,114
12 Claims. (Cl. 260—29.7)

This invention relates to the preparation of lattices of polymeric materials. More particularly, it relates to the preparation of prevulcanized chloroprene polymer latices exhibiting improved stability.

In the preparation of dipped films from chloroprene polymer latices it is usually necessary, to obtain optimum tensile properties, to subject the dried films to a temperature of about 140° C. for at least an hour. It has been discovered that dipped films which cure rapidly at relatively low temperatures may be obtained from a prevulcanized latex prepared by polymerizing chloroprene, to a certain critical degree, in an aqueous emulsion in the presence of a dialkyl xanthogen disulfide, adding to the latex hydrazine or a primary amine, and submitting the latex to a temperature ranging from about 10° C. to about 100° C. to convert the polymer in the latex from sol to gel form; however, prevulcanized latices prepared in this way have certain limitations. When such a latex is stored for several weeks, the polymer tends to coagulate. Also during storage there is a gradually increasing tendency, as the latex ages, for it to yield films of less satisfactory tensile properties.

It has unexpectedly been found that a prevulcanized chloroprene polymer latex having increased colloidal stability and which yields films of consistently good tensile properties even after prolonged storage can be prepared by a process for preparing a prevulcanized chloroprene polymer latex which comprises: (I) polymerizing chloroprene in aqueous emulsion in the presence of (a) from about 0.05 to 2 parts by weight, per 100 parts of monomer, of a dialkyl xanthogen disulfide in which each alkyl group contains from about 1 to 8 carbon atoms, and (b) from about 3 to 5 parts by weight, per 100 parts of monomer of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) adding the resulting latex at least about 0.005 mole, per 100 parts by weight of polymer in the latex, of hydrazine, an aliphatic primary monoamine or an aliphatic primary polyamine; subjecting the latex to a temperature from about 10° C. to 100° C. for a period of time sufficient to convert the sol polymer contained in the latex to gel polymer; and (III) adding to the resulting prevulcanized chloroprene polymer latex about 0.1 to about 1 part by weight per 100 parts of polymer, of formaldehyde; with the proviso that all of steps (I), (II), and (III) are carried out in an inert atmosphere free of oxygen and that in steps (II) and (III) the latex has a pH greater than about 10.

By "sol polymer" is meant polymer which is soluble in benzene. By "gel polymer" is meant polymer which is insoluble in benzene. Benzene solubility is determined by conventional methods, as for example, by isolating a sample of the polymer and adding the dried sample to a quantity of benzene. A 2- to 3-gram sample of "sol" polymer will dissolve in 250 milliliters of benzene at room temperature in 5 to 10 hours with mild agitation.

The polymerization may be carried out in aqueous emulsion using any of the conventional free-radical polymerization catalysts. These include alkali metal or ammonium ferricyanides and peroxy compounds such as alkali metal or ammonium persulfates, hydrogen peroxide, cumene hydroperoxide, and dibenzoyl peroxide.

The polymerization may be carried out between 0° C. and 80° C., preferably between 40° C. and 50° C.

The concentration of monomeric material present in the aqueous emulsion is not critical. In general, 30 to 60 percent, by weight, based on the total weight of the emulsion, is the range of concentrations of monomer used in the preparation of the latex.

It is preferred to carry out the polymerization in an alkaline system having a pH greater than 10. If the pH is lower than this, it is necessary to adjust the pH of the emulsion to higher than 10 before treatment with the amine in order to avoid coagulation of the latex during the amine treatment.

The dialkyl xanthogen disulfides which may be used have the formula

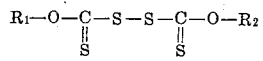

in which $R_1$ and $R_2$ are alkyl groups containing one to eight carbon atoms. Examples of suitable compounds are dimethyl xanthogen disulfide, diethyl xanthogen disulfide, dipropyl xanthogen disulfide, diisopropyl xanthogen disulfide, dibutyl xanthogen disulfide, and bis(2-ethylhexyl)xanthogen disulfide. The preferred compounds are those in which the alkyl groups have one to four carbon atoms.

The amount of dialkyl xanthogen disulfide to be used in accordance with this invention varies from about 0.05 to about 2 parts, by weight, per 100 parts of monomer. If more than about 2 parts of the dialkyl xanthogen disulfide is used, the final latex does not yield a curable film when treated with the amine. When less than 0.05 part is used, there is not a sufficient amount of the xanthogen compound present in the system to prevent formation of gel polymer during polymerization. The preferred amount is the amount of dialkyl xanthogen disulfide just sufficient to allow polymerization to proceed to 100% monomer conversion without the formation of gel polymer. The amount of each dialkyl xanthogen disulfide required will depend on the molecular weight of the disulfide. Also, for an unknown reason, there are small differences in effectiveness among molecularly equivalent amounts of the various dialkyl xanthogen disulfides. In the case of diethyl xanthogen disulfide, about 0.5 to 0.6 part by weight is required. In the case of diisopropyl xanthogen disulfide about 0.7 part is required; 0.7 to 1 part is particularly preferred. In general, the preferred amount of dialkyl xanthogen disulfide ranges from about 0.5 part to about 1.5 parts.

Unless the polymerization is allowed to proceed to the maximum monomer conversion attainable in the system at which only sol polymer is formed, films prepared from the treated latex will have unsatisfactory tensile properties. It is preferred to use just enough of the dialkyl xanthogen disulfide so that the polymerization can be allowed to proceed to 100 percent monomer conversion. The amount of each dialkyl xanthogen disulfide required to prevent formation of gel polymer when polymerization is carried to 100 percent monomer conversion can be determined by known techniques and is within the scope of one skilled in the art. When less than this amount is used, the polymerization should be stopped before it has proceeded to 100 percent conversion, but it is critical that polymerization be allowed to proceed to the highest possible conversion at which only sol polymer is obtained.

The determination of the percent of monomer conversion permissible in a polymerization may be made by known methods. One method is by taking samples of latex during the course of a polymerization, isolating polymer from the latex, and examining the polymer for a benzene-insoluble component. Polymerization in subsequent runs is then stopped at the conversion just prior to the formation of benzene-insoluble polymer. A more convenient way is to determine intrinsic viscosity of successive samples of latex during a polymerization using the Vistex method described in "Industrial and Engineering Chemistry" 49, 1709–10 (1957). Formation of microgel is indicated by a decrease in intrinsic viscosity of the latex. Polymerization in subsequent runs is then stopped at the conversion just prior to microgel formation. Optionally, polymerization may be stopped just after the peak in intrinsic viscosity has been reached. A convenient short method is to dissolve 2 milliliters of the latex in 100 milliliters of tetrahydrofuran, shake it thoroughly, and observe the turbidity of the resulting solution. The first point at which slight turbidity is observed is the point at which polymerization should be stopped.

Polymerization may be stopped by the addition of "short-stopping" agents, such as phenothiazine and 4-tert-butylcatechol, as described in U.S. Patent 2,576,009. Unreacted monomer may be removed by known methods, such as by steam stripping as disclosed in U.S. Patent 2,467,769.

It has been found that the emulsifying agent to be used in the system during polymerization is critical if the resulting latex is to be colloidally stable, that is, stable against coagulation of the prevulcanized polymer during storage. The emulsifying agent should consist of water-soluble salts (preferably sodium, potassium or ammonium salts) of a mixture of rosin acids and fatty acids. The rosin acids include the various rosins of commerce and their transformation products such as hydrogenated rosins, partially polymerized rosin, and disproportionated rosin. The latter, in which the unsaturated ingredients are compensatingly hydrogenated and dehydrogenated to the corresponding saturated and aromatic compounds, is particularly preferred.

The fatty acids may be straight-chain saturated or unsaturated carboxylic acids containing 12 to 30 carbons or the products prepared by dimerizing or trimerizing the unsaturated fatty acids. Examples of suitable fatty acids include lauric acid, stearic acid, eicosanoic acid, oleic acid, linoleic acid, and dimers and trimers of polyunsaturated fatty acids such as linoleic acid. Of these, the particularly preferred acids are oleic acid and a mixture of dimers and trimers of linoleic acid.

The total amount of the emulsifying composition should range from, by weight, about 3 to about 5 parts per 100 parts of monomer used in the polymerization. If less than 3 parts are used, the resulting latex will not have satisfactory colloidal stability. More than 5 parts will make it difficult to prepare films from the latex by a dipping process or to prepare foams by conventional techniques. Of the total amount of emulsifying agent used, the percentage of fatty acid soap should range from about 15 to about 50 percent. Less than 15 percent does not give the resulting latex satisfactory colloidal stability and more than 50 percent adversely affects the quality of dipped films prepared from the latex.

It may sometimes be desirable to supplement the rosin salt and fatty acid salt by other dispersing agents, such as the salts of aromatic sulfonic acids. These are useful in reducing the small amount of coagulation which may occur in the continuous polymerization system or when the latex is distilled to remove unused chloroprene monomer.

The treating agent which is used to prevulcanize the chloroprene polymer latex is hydrazine or an aliphatic primary amine, which amine may be a monoamine or a polyamine. By the term "aliphatic" is meant that the amine is attached to an aliphatic carbon atom. Aromatic rings may be present in the molecule with the proviso that the amino group is not directly attached to the aromatic nucleus. Suitable amines include both cyclic and acyclic alkylamines, acyclic alkylenediamines, cycloalkylenediamines, and polyalkylenepolyamines. It is to be understood that these aliphatic radicals may be substituted with phenyl radicals. Also the aliphatic chains may be interrupted by or fused with arylene radicals, provided that the amino group is attached to an aliphatic carbon atom. Thus among suitable treating agents are included such amines as aralkylamines, poly(aminoalkyl)-substituted aromatic rings and benzo-substituted cycloaliphatic amines. The radicals to which the amino group or groups are attached preferably are those containing no more than 16 carbon atoms since there is no advantage to be gained in using amines of higher molecular weight.

Representative examples of suitable monoamines are methylamine, ethylamine, n-propylamine, isopropylamine, n-butylamine, sec-butylamine, hexylamine, decylamine, 2-ethyl-hexylamine, cyclohexylamine, benzylamine, and phenethylamine. Representative examples of polyamines include ethylenediamine, 1,2-propanediamine, 1,4-butanediamine, 1,6-hexanediamine, 1,4-cyclohexanediamine, 1,10-decanediamine, 2-phenyl-1,3-propanediamine, $\alpha,\alpha'$-xylenediamine, 2,4-diphenyl-1,3-butanediamine, diethylenetriamine, and tetraethylenepentamine.

The preferred amines are those containing 2 to 8 carbon atoms, particularly alkylamines or alkylenediamines. The most preferred amines are ethylene diamine, 1,6-hexanediamine, and butylamine.

For convenience, throughout this specification the term "treating agent" is to include either hydrazine or a suitable amine.

The treating agent is added to the latex after polymerization is complete and, in cases where polymerization is not carried to 100% monomer conversion, after the latex has been stabilized against further polymerization and any unused monomer has been removed. It is preferred to add the treating agent to the latex in a dilute form in order to avoid coagulation of the latex. Hydrazine may be conveniently added as an aqueous solution of hydrazine hydrate. Water-soluble amines may also be added as aqueous solutions. If the amine is not water-soluble, it may be emulsified with water, using an emulsifying agent such as sodium oleate or the sodium salt of a fatty alcohol sulfate. The latex may be agitated during the addition of the amine. This, however, is not essential.

It is essential to carry out the amine treatment in an inert atmosphere; that is, in an atmosphere free of oxygen. This is conveniently done by flushing the reaction vessel free of oxygen with an inert gas such as nitrogen or argon and maintaining an atmosphere of the gas in the vessel during the treatment.

The reaction is carried out at any temperature from 10° C. to 100° C. The time required for the conversion of the sol polymer to gel polymer depends upon the temperature. Below 10° C. the reaction proceeds too slowly to be practical. Temperatures above 100° C. are not attainable in the aqueous latex at ordinary pressures. Higher temperatures could be used at superatmospheric pressures. The time required will vary somewhat with the effectiveness of the particular treating agent being used. The preferred temperature range is from 60 to 100° C. At 60° C., twelve hours is usually sufficient to gel the polymer, and at 100° C., gel formation should be complete within one-half hour. At 10° C. as long a time as 10–14 days may be required.

The treating agent should be added in such an amount that there is a total of at least 0.005 mole of agent per 100 parts by weight of polymer. In using the term "mole" of treating agent with the term "parts by weight" of polymer, it is to be understood that the unit of the molecular weight in the mole is to be consistent with the unit used in expressing the weight of the polymer. For example, if the weight of the polymer is expressed in pounds, a molar amount of amine will correspond to the molecular weight in pounds of the amines (including hydrazine if present). Thus, the term "moles" could be expressed as "part moles," where "part" represents the weight unit being used in a particular situation. However, for convenience, the term "moles" has been used throughout.

If less then about 0.005 mole of treating agent is used per 100 parts by weight of polymer, films prepared from the latex will have unsatisfactory tensile properties. The preferred amounts range from 0.008 to 0.2 mole. More than this may be used, but there is no advantage to be gained by using a larger amount.

Formaldehyde is conveniently added as an aqueous solution, preferably in a concentration of about 20 percent or less to avoid coagulating the polymer. The use of a formaldehyde-yielding material such as paraformaldehyde is also within the scope of this invention. The effective amount of formaldehyde to be used in practicing this invention ranges from about 0.1 part by weight to about 1 part by weight per 100 parts of polymer in the latex. The equivalent of 0.1 part of formaldehyde is the minimum amount which will prevent loss of tensile strength of films prepared from the aged latex. On the other hand, when more than one part of formaldehyde is used, the colloidal stability of the latex is adversely affected.

The invention will now be described in and by the following examples of specific embodiments thereof wherein all parts and percentages are by weight unless otherwise specified.

EXAMPLE 1

A latex is prepared by polymerizing chloroprene in an aqueous emulsion using the follownig recipe:

| | Parts |
|---|---|
| Chloroprene | 100 |
| Disproportionated rosin | 2.4 |
| An acid resulting from the polymerization of linoleic acid | 1.6 |
| Water | 83.3 |
| Sodium hydroxide | 1.04 |
| Diisopropyl xanthogen disulfide | 0.7 |
| Sodium formaldehyde sulfoxylate | 0.2 |

The disproportionated rosin used has been partially neutralized with sodium carbonate so that it has an acid number of about 140. It is commercially available from Hercules Powder Co. as "Resin 731–SA." The polymerized linoleic acid used is essentially a $C_{36}$ dibasic acid containing about 75 percent dimer, about 22 percent trimer, and about 3 percent monomer. It is commercially available from Emery Industries, Inc., as "Empol 1022." An atmosphere of nitrogen is maintained in the polymerization vessel. Polymerization is effected by adding a 5 percent aqueous solution of potassium persulfate at a rate sufficient to maintain the desired rate of polymerization. The temperature is maintained at 30° C. and polymerization is carried to 100 percent monomer conversion. The polymer content of the latex is about 55 percent and the pH is 12.8.

A 2-gram sample of polymer obtained from the latex is completely soluble in 250 ml. of benzene at room temperature with mild agitation. The sample is obtained in the following manner:

A sample of latex is removed from the system and the polymer is precipitated with acetone. The wet coagulum is dissolved in benzene and reprecipitated with acetone. The coagulum is separated from the benzene and dried, first in air and then under vacuum, at 25–30° C.

While maintaining a nitrogen atmosphere in the reaction vessel, 1 part of 1,6-hexanediamine (0.0086 mole) per 100 parts of polymer is added to the latex. The temperature is raised to 60° C. and maintained at this temperature for 16 hours.

One sample (Sample A) of the treated latex is used immediately for the preparation of dipped films. To another sample (Sample B) is added enough of a 20 percent solution of formaldehyde to provide 0.15 part of formaldehyde per 100 parts of polymer in the latex. Sample B and another sample (Sample C) of the treated latex to which no formaldehyde has been added are then placed in an oven and held at 50° C. for six days. The latex does not coagulate during this period. Dipped films are then prepared from Samples B and C.

Dipped films are prepared in the following manner. The latex is compounded using the recipe:

| | Parts |
|---|---|
| Polychloroprene (dry basis) | 100 |
| Zinc oxide | 5 |
| Clay | 10 |
| Sodium salt of sulfated methyl oleate | 1 |
| N-phenyl-2-naphthylamine | 2 |

A form is immersed in a coagulant consisting of an acetone-methanol solution of equal amounts of calcium chloride and calcium nitrate tetrahydrate. The form is withdrawn from the coagulant and immersed in the compounded latex for 5 minutes. The form coated with the coagulated latex is withdrawn from the latex and again immersed in the coagulant for a period of 10 seconds. The coagulated film is leached in water for 4 hours and dried first in air and then in a hot air oven for 2 hours at 70° C. The tensile properties of the films are measured by ASTM Method D412–51T.

The following table shows typical properties of films prepared from Samples A, B, and C.

| | A | B | C |
|---|---|---|---|
| | Unaged | Aged (CH$_2$O added) | Aged (no CH$_2$O added) |
| Tensile strength at the break, p.s.i. | 3,500 | 3,280 | 2,500 |
| Elongation at the break, percent | 940 | 830 | 780 |
| Modulus at 600% elongation, p.s.i. | 875 | 1,200 | 1,080 |

Similar results are obtained when the latex to which the 1,6-hexanediamine has been added is heated at 90° C., for one-half hour instead of at 60° C. for 16 hours.

In this example, Sample B, which embodies the improvement of this invention, is shown even after aging to provide films which compare favorably with those prepared from fresh latex. If, however, the formaldehyde treatment is omitted, the aged latex (Sample C) provides markedly inferior films.

EXAMPLE 2

Similar results are obtained when Example 1 is repeated using oleic acid instead of polymerized linoleic acid.

When, however, 5 parts of disproportionated rosin and no fatty acid component are used in the polymerization and the resulting latex is treated as described in Example 1, the latex coagulates after 2 days when it is aged at 50° C. This illustrates that operating outside the scope of the invention by omitting the fatty acid component yields an unsatisfactory latex.

EXAMPLE 3

Example 1 is repeated except that the latex is allowed to stand at room temperature (20–25° C.) for 128 hours instead of being heated at 60° C. for 16 hours.

Satisfactory latices are obtained having properties similar to those of Samples A and B of Example 1.

EXAMPLE 4

Example 1 is repeated using 3 parts (0.06 mole) of hydrazine hydrate instead of the 1 part of 1,6-hexanediamine in the treating step. The hydrazine hydrate is added to the latex as a 30 percent aqueous solution. Satisfactory latices are obtained having properties similar to those of Samples A and B of Example 1.

EXAMPLE 5

Results similar to those of Example 1 are obtained when Example 1 is repeated using, instead of diisopropyl xanthogen disulfide, one of the following:

| | Parts |
|---|---|
| Dimethyl xanthogen disulfide | 0.5 |
| Di-n-butyl xanthogen disulfide | 0.8 |
| Bis(2-ethylhexyl)xanthogen disulfide | 1.2 |

EXAMPLE 6

A latex is prepared as described in Example 1 except that 0.1 part of diisopropyl xanthogen disulfide is used in the recipe. Since this is not enough modifying agent to permit the monomer conversion to be carried to 100 percent, the point at which conversion should be stopped is determined by removing samples of the latex during the polymerization, dissolving 2 ml. in 100 ml. of tetrahydrofuran, shaking thoroughly, and observing the solution for turbidity. Polymerization is stopped when turbidity is first observed by adding an emulsion containing 0.01 part of phenothiazine and 0.01 part of p-tert-butylcatechol, as described in U.S. Patent 2,576,009. The resulting latex has a polymer content of 12.5 percent. Unreacted monomer is removed by steam stripping as described in U.S. Patent 2,467,769.

The latex is treated with 1,6-hexanediamine and formaldehyde as described in Example 1.

Dipped films prepared from the treated latex have satisfactory properties similar to those prepared from Samples A and B of Example 1.

EXAMPLE 7

A latex is prepared and treated in the same way as Samples A and B of Example 1 except that 2 parts of diisopropyl xanthogen disulfide are used in the polymerization. Dipped films prepared from the treated latex have satisfactory properties similar to those of Samples A and B of Example 1.

EXAMPLE 8

A latex is prepared using the following recipe:

| | Parts |
|---|---|
| Chloroprene | 100 |
| Disproportionated rosin (same as in Example 1) | 2.4 |
| Polymerized linoleic acid (same as in Example 1) | 1.6 |
| Water | 91.6 |
| Sodium hydroxide | 1.1 |
| Diethyl xanthogen disulfide | 0.566 |
| Sodium formaldehyde sulfoxylate | 0.2 |

A nitrogen atmosphere is maintained in the polymerization vessel. Polymerization is effected at 30° C. by the addition of a 1% solution of potassium persulfate. Monomer conversion is 100%.

The polymer content in the latex is 50% and the pH is 12–13. A sample of polymer isolated from the latex as described in Example 1 is soluble in benzene.

To the latex is added one part by weight of 1,6-hexanediamine per 100 parts of polymer and the latex is maintained at 50° C. for 48 hours in a nitrogen atmosphere. One sample of the treated latex is used immediately for the preparation of dipped films. To another portion (Sample B) of the latex is added 0.2 part by weight of formaldehyde, per 100 parts of polymer (added as a 20% aqueous solution). This sample and another sample (Sample C) of treated latex to which no formaldehyde is added are aged in an oven at 50° C. for 4 days. At the end of this time Samples B and C are used for the preparation of dipped films. Films are prepared and tested as described in Example 1. Table II shows typical properties of films prepared from the three samples.

| | A | B | C |
|---|---|---|---|
| | Unaged | Aged (CH$_2$O added) | Aged (no CH$_2$O added) |
| Tensile strength at the break, p.s.i. | 3,000 | 3,700 | 2,750 |
| Elongation at the break, percent | 900 | 875 | 820 |
| Modulus at 600% elongation, p.s.i. | 1,000 | 1,220 | 1,150 |

Similar results are obtained when 1 part by weight of formaldehyde, per 100 parts of polymer, is added instead of 0.2 part.

EXAMPLE 9

A chloroprene polymer latex is prepared using the following recipe:

| | Parts |
|---|---|
| Chloroprene | 100 |
| Disproportionated rosin (same as in Example 1) | 2.5 |
| Polymerized linoleic acid (same as in Example 1) | 1.5 |
| Water | 91.7 |
| Sodium hydroxide | 1.13 |
| Diethyl xanthogen disulfide | 0.54 |
| Sodium formaldehyde sulfoxylate | 0.2 |

A nitrogen atmosphere is maintained in the polymerization vessel. Polymerization is carried out to complete conversion at 30° C. using as catalyst a 1% aqueous solution of potassium persulfate. The pH of the latex is 12–13. To the latex is added 4 parts of ethylenediamine per 100 parts of polymer and the latex is heated at 60° C. for 16 hours. One sample (Sample A) of the treated latex is used immediately for the preparation of dipped films. To another sample (Sample B) is added enough of a 20% aqueous solution of formaldehyde to provide 0.2 part by weight of formaldehyde per 100 parts of polymer. This sample and another sample (Sample C) of the treated latex to which no formaldehyde has been added are placed in an oven and held at 50° C. for 5 days. Films are then prepared from Samples B and C. The following table shows typical tensile properties of films prepared from Samples A, B, and C.

| | A | B | C |
|---|---|---|---|
| | Unaged | Aged With CH$_2$O | Aged Without CH$_2$O |
| Tensile strength at the break, p.s.i. | 2,900 | 3,135 | 2,535 |
| Elongation at the break, percent | 840 | 830 | 780 |
| Modulus at 600% elongation, p.s.i. | 1,110 | 1,340 | 1,200 |

Similar results are obtained when this example is repeated except that the chloroprene monomer is replaced by one of the following mixtures of monomers:

(a) A mixture of 93.0 parts of chloroprene and 7.0 parts 2,3-dichloro-1,3-butadiene.
(b) A mixture of 97.5 parts of chloroprene and 2.5 parts of methacrylic acid.
(c) A mixture of 44 parts of chloroprene and 56 parts of 2,3-dichloro-1,3-butadiene.

EXAMPLE 10

Example 1 is repeated except that instead of 1,6-hexanediamine, one of the following amines is used:

| | Parts | Mole |
|---|---|---|
| Butylamine | 5 | 0.068 |
| Hexylamine | 10 | 0.092 |
| Cyclohexylamine | 10 | 0.101 |
| Benzylamine | 10 | 0.099 |

Each of the last three is added as an aqueous emulsion in which sodium lauryl sulfate is used as the emulsifying agent.

The films prepared from the treated latices have properties similar to those of Samples A and B of Example 1.

The "chloroprene polymer" in the latices to be prevulcanized according to this invention may be homopolymers of chloroprene or copolymers of chloroprene with one or more comonomer, copolymerizable with chloroprene, which comonomer contains olefinic unsaturation. Suitable copolymers contain at least 40 percent by weight of the chloroprene monomer. Satisfactory monomers copolymerizable with chloroprene include those compounds containing the group $CH_2=C<$ of the following representative types: vinyl-substituted aromatic compounds, such as styrene, vinyltoluenes, and vinylnaphthalenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene.

The latex prepared in accordance with this invention is particularly suitable for the preparation of dipped films which cure rapidly and have excellent tensile properties, e.g., for the preparation of rubber gloves, rubber threads or the like. The dipped films may be prepared by conventional methods, as, for example, as described in Cook and Fitch, "Neoprene Dipped Goods," Rubber Chemicals Division (now Elastomer Chemicals Department), E. I. du Pont de Nemours and Co., Report No. 52–3, December 1952. The films produced from the latex prepared in accordance with this invention require shorter times and lower temperatures to develop optimum tensile properties than do films prepared from conventional neoprene latices. Furthermore, the treated latex may be stored without coagulation of the polymer for a considerable length of time, and films prepared from the stored latex will show little or no deterioration in tensile properties compared with films prepared from freshly treated latex.

The prevulcanized polychloroprene latices of this invention also possess outstanding advantages when they are used in the preparation of foams. Foams prepared from the prevulcanized latex may be cured in open steam to yield foams of exceptionally good tensile strength. This makes it possible to fabricate articles from chloroprene polymers using the same type of production-line assemblies conventionally used in fabricating foam articles from natural rubber. Furthermore, it has been found that the addition of formaldehyde in accordance with this invention eliminates formation of hydrogen sulfide during the fabrication of foam articles. This evolution of hydrogen sulfide is observed when the prevulcanized latex, to which no formaldehyde has been added, is acidified during the foam-forming process.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for preparing a prevulcanized chloroprene polymer latex which comprises: (I) polymerizing chloroprene in aqueous emulsion in the presence of (a) from about 0.05 to 2 parts by weight, per 100 parts of monomer of a dialkyl xanthogen disulfide in which each alkyl group contains from about 1 to 8 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) adding to the resulting latex at least about 0.005 mole, per 100 parts by weight of polymer in the latex, of a member of the group consisting of hydrazine, an aliphatic primary monoamine and an aliphatic primary polyamine, and subjecting the latex to a temperature of from about 10° C. to 100° C. for a period of time sufficient to convert the sol polymer contained in the latex to gel polymer; and (III) adding to the resulting prevulcanized chloroprene polymer latex about 0.1 to about 1 part by weight per 100 parts of polymer of formaldehyde; steps (I), (II) and (III) being carried out in an inert atmosphere free of oxygen, and the pH of the latex in steps (II) and (III) being greater than about 10.

2. A process for preparing a prevulcanized chloroprene polymer latex which comprises: (I) polymerizing chloroprene in aqueous emulsion in the presence of (a) from about 0.5 to 1.5 parts by weight, per 100 parts of monomer, of dialkyl xanthogen disulfide in which each alkyl group contains from 1 to 4 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) adding to the resulting latex from about 0.008 to 0.2 mole, per 100 parts by weight of polymer in the latex, of a primary alkanediamine of from about 2 to 8 carbon atoms, and subjecting the resulting treated latex to a temperature of from about 60° C. to 100° C. for a period of time sufficient to convert the sol polymer contained in the latex to gel polymer; and (III) adding to the resulting prevulcanized chloroprene polymer latex about 0.1 to about 1 part by weight per 100 parts of polymer of formaldehyde; steps (I), (II) and (III) being carried out in an inert atmosphere free of oxygen, and the pH of the latex in steps (II) and (III) being greater than about 10.

3. A process as defined in claim 2 wherein said primary alkanediamine is 1,6-hexanediamine.

4. A process as defined in claim 2 wherein said fatty acid soap is a polylinoleic acid soap and wherein said rosin acid soap is disproportionated rosin.

5. A prevulcanized chloroprene polymer latex prepared by the process of claim 1.

6. A prevulcanized chloroprene polymer latex prepared by the process of claim 2.

7. A process for preparing a dipped film, which process comprises: (I) polymerizing chloroprene in aqueous emulsion in the presence of (a) from about 0.05 to 2 parts by weight, per 100 parts of monomer, of a dialkyl xanthogen disulfide in which each alkyl group contains from about 1 to 8 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) adding to the resulting latex at least about 0.005 mole per 100 parts by weight of polymer in the latex of a member of the group consisting of hydrazine, an aliphatic primary monoamine and an aliphatic primary polyamine and subjecting the resulting treated latex to a temperature from about 10° C. to 100° C. for a period of time sufficient to convert the sol polymer contained in the latex to gel polymer; (III) adding to the resulting prevulcanized chloroprene polymer latex about 0.1 to about 1 part by weight per 100 parts of polymer of formaldehyde; steps (I), (II), and (III) being carried out in an inert atmosphere free of oxygen, and the pH of the latex in steps (II) and (III) being greater than about 10; and (IV) forming a coagulated film of the resulting treated latex.

8. A process for preparing a dipped film, which process comprises: (I) polymerizing chloroprene in aqueous emulsion in the presence of (a) from about 0.5 to 1.5 parts by weight, per 100 parts of monomer, of dialkyl xanthogen disulfide in which each alkyl group contains from 1 to 4 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) adding to the resulting latex from about 0.008 to 0.2 mole per 100 parts by weight of polymer in the latex of a primary alkanediamine of from about 2 to 8 carbon atoms, and subjecting the resulting treated latex to a temperature from about 60° C. to 100° C. for a period of time sufficient to convert the sol polymer contained in the latex to gel polymer; (III) adding to the resulting prevulcanized chloroprene polymer latex about 0.1 to about 1 part by weight per 100 parts of polymer of formaldehyde; steps (I), (II), and (III) being carried out in an inert atmosphere free of oxygen, and the pH of the latex in steps (II) and (III) being greater than about 10; and (IV) forming a coagulated film of the resulting treated latex.

9. A process as defined in claim 8 wherein said primary alkanediamine is 1,6-hexadiamine.

10. A process as defined in claim 9 wherein said fatty acid soap is a polylinoleic acid soap and wherein said rosin acid soap is disproportionated rosin.

11. A dipped film prepared by the process of claim 7.

12. A dipped film prepared by the process of claim 8.

References Cited

UNITED STATES PATENTS

| | | | |
|---|---|---|---|
| 2,540,596 | 2/1951 | Rehner et al. | 260—92.3 |
| 3,047,544 | 7/1962 | Byrd | 260—79 |
| 3,190,865 | 6/1965 | Miller | 260—92.3 |
| 2,863,843 | 12/1958 | Scott et al. | 260—29.6 |
| 3,300,433 | 1/1967 | Apotheker | 260—29.7 |
| 3,317,451 | 5/1967 | Apotheker | 260—29.7 |

OTHER REFERENCES

Walker: Formaldehyde, Reinhold (1st ed., 1944), pages 279–284 and 586 relied upon.

JOSEPH L. SCHOFER, *Primary Examiner.*

H. I. CANTOR, W. F. HAMROCK, *Assistant Examiners.*